July 8, 1924.                    1,500,116
B. J. DOWD
TYPEWRITING MACHINE
Filed Aug. 29, 1923          2 Sheets-Sheet 1
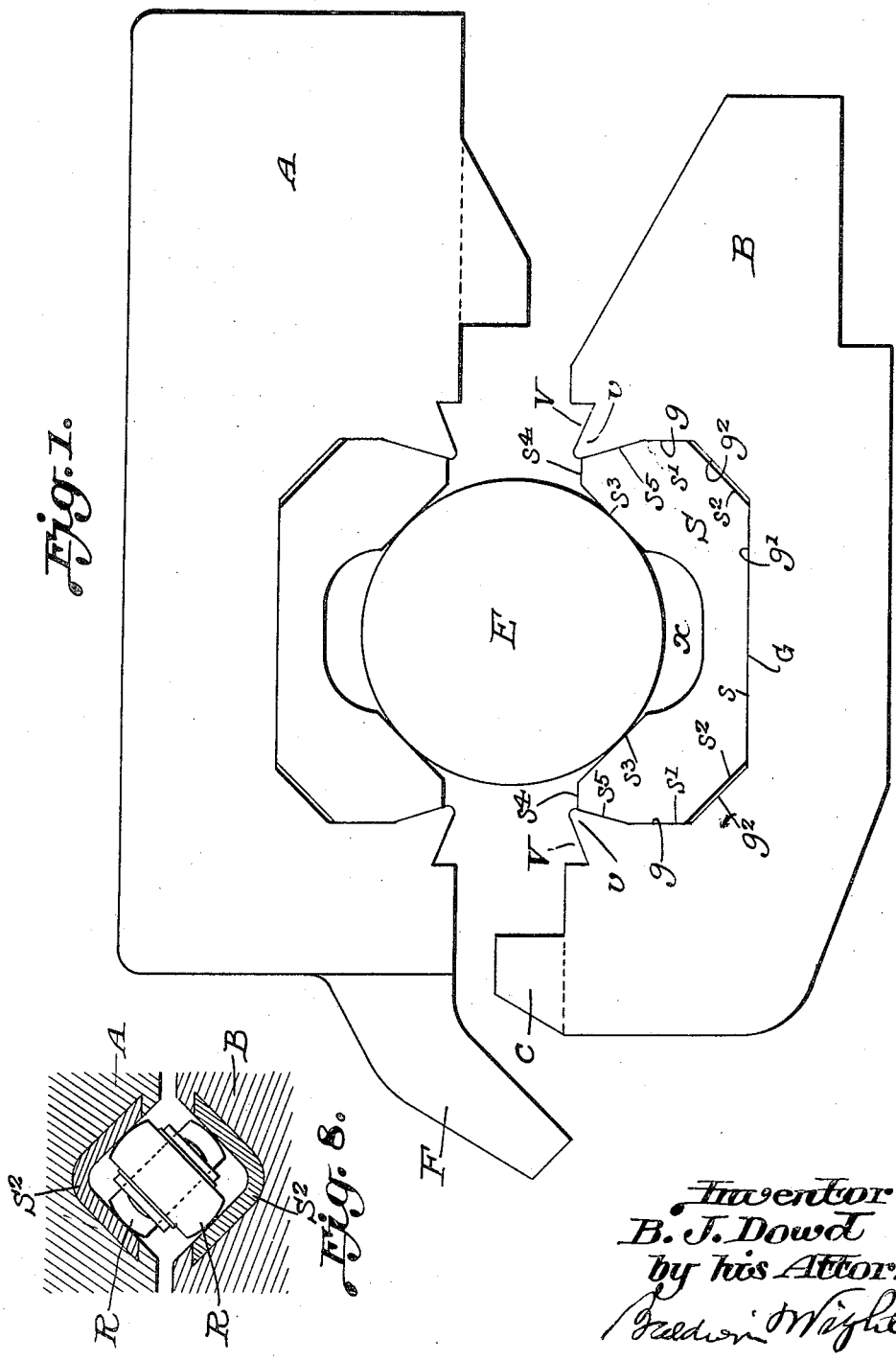

July 8, 1924.
B. J. DOWD
1,500,116
TYPEWRITING MACHINE
Filed Aug. 29, 1923
2 Sheets-Sheet 2
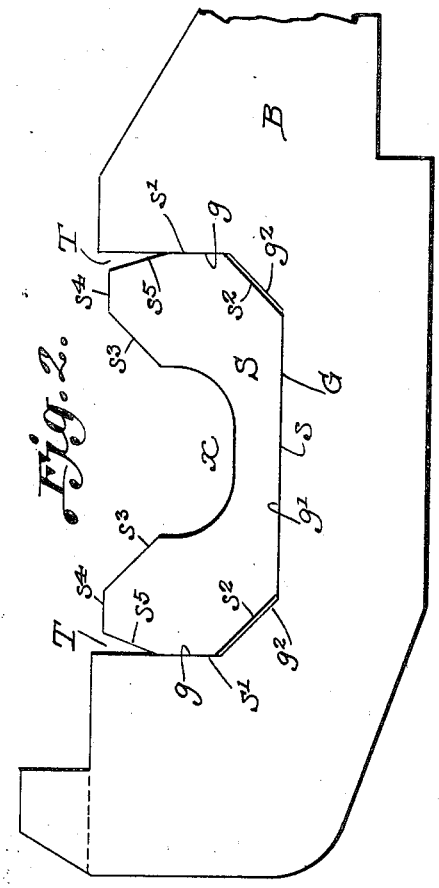
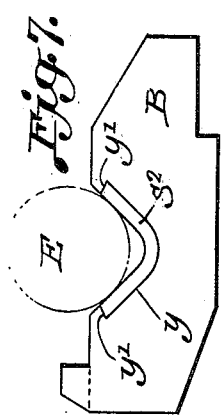
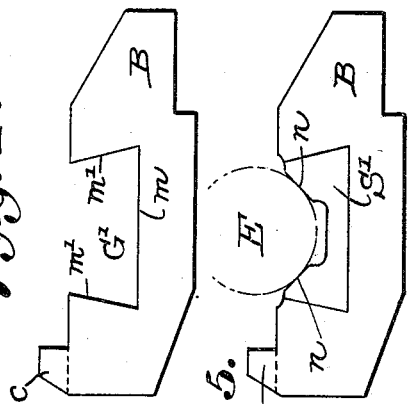
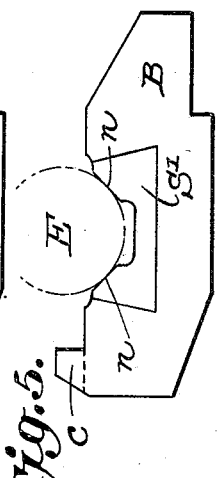
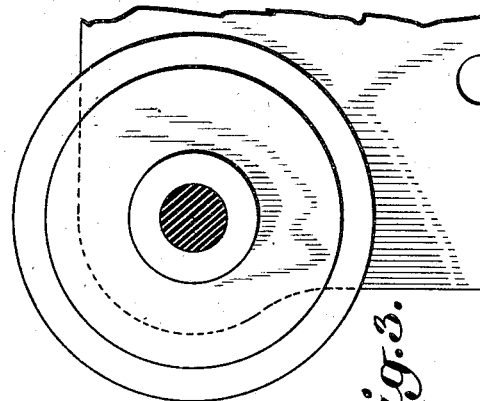
Inventor
B. J. Dowd
by his Attorneys
Baldwin Wight Patented July 8, 1924.

1,500,116

UNITED STATES PATENT OFFICE.

BERNARD J. DOWD, OF HARTFORD, CONNECTICUT, ASSIGNOR TO ROYAL TYPEWRITER COMPANY, INC., OF NEW YORK, N. Y., A CORPORATION OF NEW YORK.

TYPEWRITING MACHINE.

Application filed August 29, 1923. Serial No. 660,008.

*To all whom it may concern:*

Be it known that I, BERNARD J. DOWD, a citizen of the United States, residing at Hartford, in the county of Hartford and State of Connecticut, have invented certain new and useful Improvements in Typewriting Machines, of which the following is a specification.

This invention relates to typewriting machines in which the typewriter carriage is made to run on balls or roller bearings in order to reduce friction and provide for the easy movement of the carriage back and forth across the machine. This is a desirable feature of the Royal standard machine. In that machine, the carriage rail and the shift rail are grooved to receive balls of case hardened steel and these rails are provided with teeth engaged by circular pinions or ball gears which travel back and forth with the balls in the grooves. Heretofore the balls have been made to engage directly with the walls of the grooves in the rails and in order to avoid undue wear, the rails have been made of relatively hard material. As the rails are comparatively large, the expense of their manufacture has been considerable.

According to my invention, I can make the rails of relatively cheap material and I insert in the grooves bearing strips of relatively hard material with which the balls engage instead of engaging with the walls of the rails. These inserts may be suitably shaped and finished to present wearing surfaces for the balls which are most durable and allow the balls to move with the greatest ease. In this way the rails may be made of relatively soft or cheap material and may be machined and finished at relatively low cost. The bearing strips or inserts may be given a variety of shapes and may be mounted and locked in the rails in various ways, some of which are illustrated in the accompanying drawings and will be hereinafter described.

Figure 1 is a view on an enlarged scale of a carriage rail and a shift rail provided with ball bearings and wearing strips made in accordance with my invention.

Figure 2 is an enlarged end view of a shift rail and a wearing strip, and illustrates how the wearing strip or insert is mounted in the groove of the shift rail before it is locked therein.

Figure 3 is a view in vertical section through the carriage rail and the shift rail with the interposed anti-friction bearings in working position.

Figures 4 and 5 illustrate a modified way of constructing the shift rail.

Figure 6 is a perspective view of a portion of the insert or wearing strip suitable for use in connection with a shift rail of the kind shown in Figures 4 and 5.

Figure 7 shows a further modification in which the groove in the shift rail is differently formed from those shown in the preceding figures of the drawing, and in which the insert or wearing strip is of a different shape.

Figure 8 is a sectional view showing portions of a carriage rail and a shift rail equipped with anti-friction bearings of the kind indicated in Figure 7.

It will be understood that the wearing strip or insert in the carriage rail is of substantially the same construction as that in the shift rail. Therefore, in some cases the carriage rail has not been illustrated as being associated with the shift rail.

The carriage rail A and the shift rail B, as before stated, may be made of relatively soft material, that is, such rails may be made of softer material than those heretofore employed in the Royal standard machine, but should of course be sufficiently strong to withstand all shocks and strains, but they need not be of such hard material as to provide wearing surfaces for the balls interposed between them, inasmuch as by my invention wearing strips which engage the balls are mounted in grooves or sockets in the rails. The wearing strips may be given various shapes and may be mounted and locked in the rails in various ways. One way is illustrated in Figures 1, 2, and 3. In this case the shift rail B is formed with a groove G to receive the wearing strip S. Preferably the groove is formed with two straight parallel side walls $g$, a straight bottom wall $g'$ connected to the side walls by inclined walls $g^2$ as illustrated particularly in Figure 2. In this condition the groove G may receive the wearing strip or insert S, which may be let down vertically into the groove or inserted endwise therein. In end view or cross section the wearing strip shown in Figures 1, 2, and 3 conforms substantially with the groove G. It has a bottom wall $s$ corresponding with the bottom wall $g'$ of the groove, side walls $s'$ corresponding with the side walls $g$, and inclined walls $s^2$ corresponding with the walls $g^2$. The strip S has a centrally arranged groove $x$ to receive the balls and the walls of the groove $x$ connect with inclined walls $s^3$, which in turn connect with the top portions $s^4$ of the strip. The top of the strip connects with the side walls $s'$ by inclined portions $s^5$.

By reference to Figure 2 it will be observed that there is a triangular space T between the upper part of the wearing strip and the side walls $g$ of the groove G.

Referring now to Figure 1 it will be observed that the rail B has been cut at V and the parts $v$ have been turned inwards toward each other and made to engage the walls $s^5$ of the strip. In this way the wearing strip or insert is firmly locked in the groove of the rail. The wearing strip of the carriage rail is preferably inserted and locked in precisely the same way. The completed bearing is illustrated in Figure 3. As heretofore the upper and lower rails are held together by clamps C of usual construction. The rails are formed with teeth $c$ which engage the circular pinions or ball holders D, and the balls E are mounted and held in the pinions as in all Royal standard machines.

In order to protect the bearings, the rail A is formed with a dust shed F which prevents dust or other matter from entering the bearings. The bearing strips or inserts may be made of extremely hard material to properly cooperate with the hard balls E. It is only necessary, however, to carefully finish the surfaces $s^3$ of the strip which are the only parts that come in contact with the balls. Practical experience has demonstrated that much time, labor, and expense can be saved by providing the rails with inserts or wearing strips in the manner hereinbefore described.

Figures 4, 5, and 6 show that wearing strips of a different kind may be employed without departing from my invention. In this case the shift rail B is formed with a groove G' having a straight bottom wall $m$ and inclined side walls $m'$. The wearing strip S' is shaped to fit the groove G' and may be inserted endwise therein. The wearing surfaces which come in contact with the balls are indicated at $n$. The wearing strip S' is inserted endwise in the groove and locked therein. This may be done by so heating the rail as to expand it, then inserting the strip, and then allowing the rail to cool and contract in such manner as to firmly grip the strip.

Another simple way of embodying my invention is illustrated in Figures 7 and 8. In this case the shift rail B is formed with a V-shaped groove $y$ and the bearing strip $S^2$ is V-shaped in cross section. In this case also the wearing strip is inserted endwise in the groove and may be made to so closely fit the groove that it will be held tight therein. As indicated in Figure 8, the strips $S^2$ for the upper and lower rails are of the same construction and are held in place in the same way. In the modification shown in Figure 8, instead of using balls as in the remaining figures of the drawings I may employ rollers R as indicated. The strip $S^2$ may be made of sheet metal of suitable hardness and may be driven into the groove $y$ by hydraulic mechanism. It will be observed that the ends $y'$ of the groove are angular or inclined and the ends of the strip $S^2$ are correspondingly formed. This construction facilitates the locking of the strip in the rail. Inasmuch as the rails are preferably made of castings which are somewhat brittle and as the wearing members are of hard and rigid steel and are parallel with the rails, they add strength thereto and preserve their proper alignment.

I claim as my invention:

1. A bearing for a typewriter carriage, comprising balls or rollers, and rails between which the balls are mounted provided with wearing members having wearing faces which engage the balls, one of said rails having a forwardly extending flange to protect the bearing from dust.

2. In a typewriting machine, a bearing rail comprising a body member of relatively soft material having a longitudinal groove, and a wearing member of relatively hard material substantially fitting said groove but having the upper portions of its outer side walls inclined inwardly, the material of the body member being forced inwardly into engagement with the wearing member after the latter is positioned, to hold it in locked position.

3. In a typewriting machine, a bearing rail comprising a body member of relatively soft material having a straight sided longitudinal groove, a straight sided wearing member of relatively hard material fitting within said groove but having the upper portions of its outer side walls inclined inwardly, the material of the body member being forced inwardly into engagement with these side wall portions of the wearing member after the latter is positioned, to hold it in locked position.

In testimony whereof, I have hereunto subscribed my name.

BERNARD J. DOWD.